Patented July 3, 1951

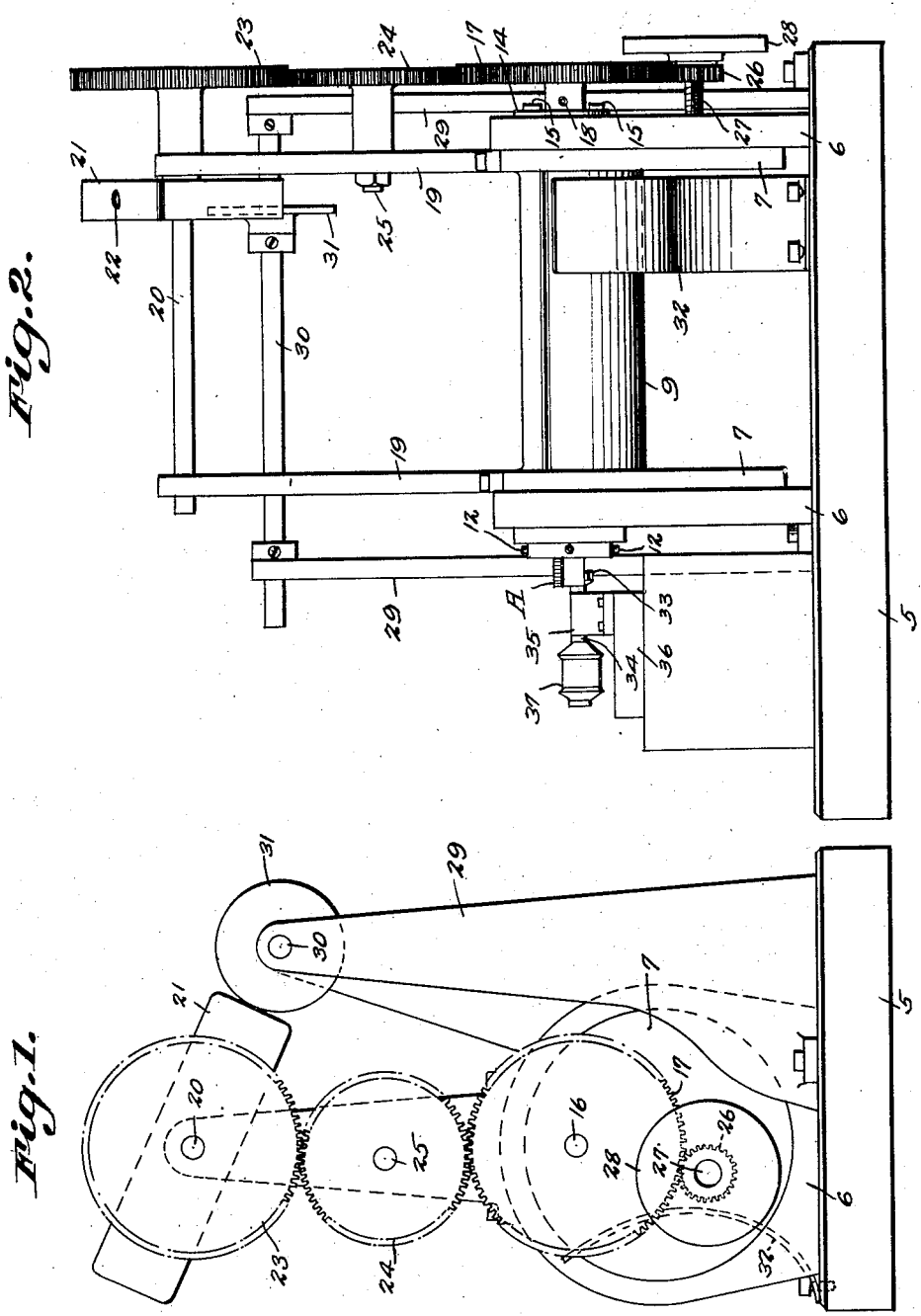

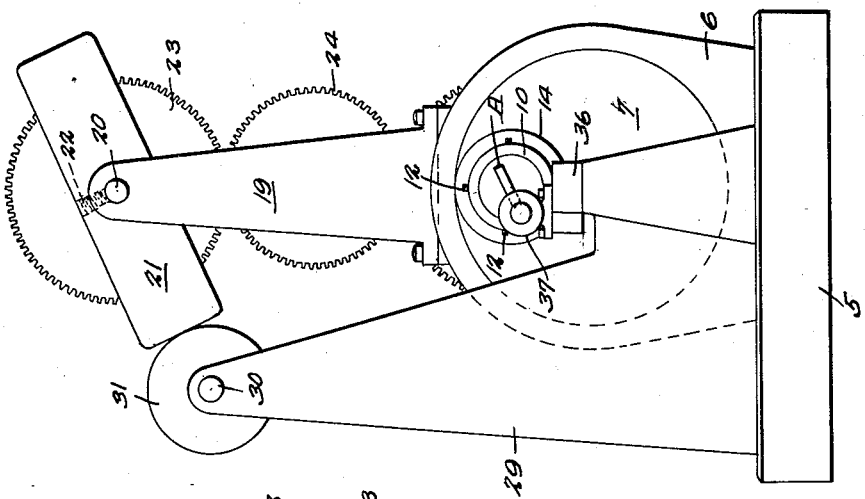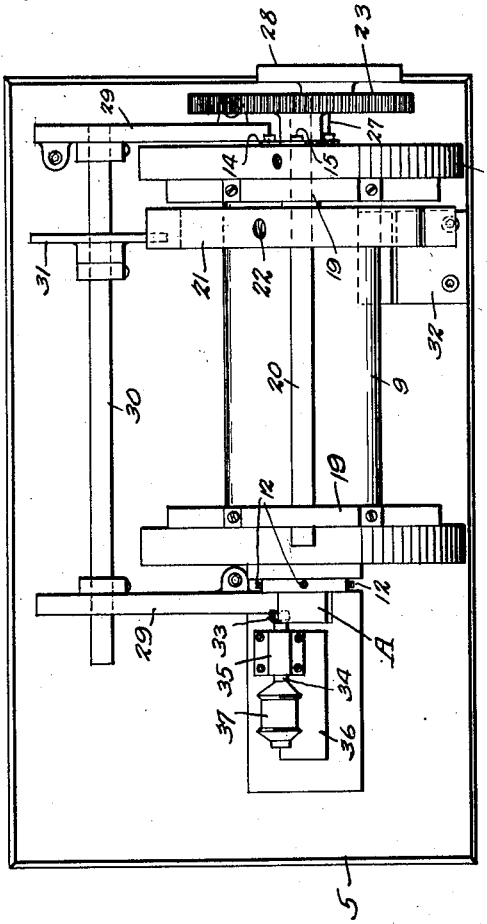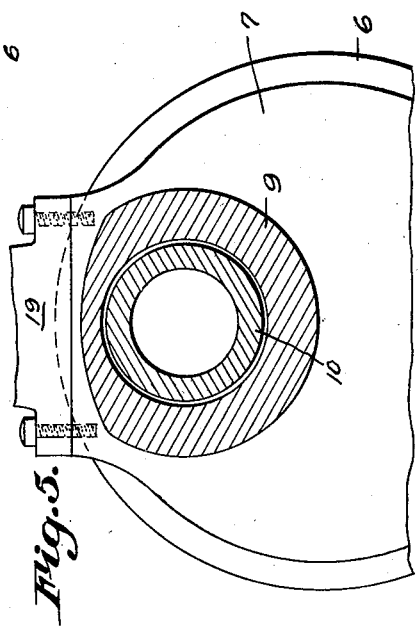

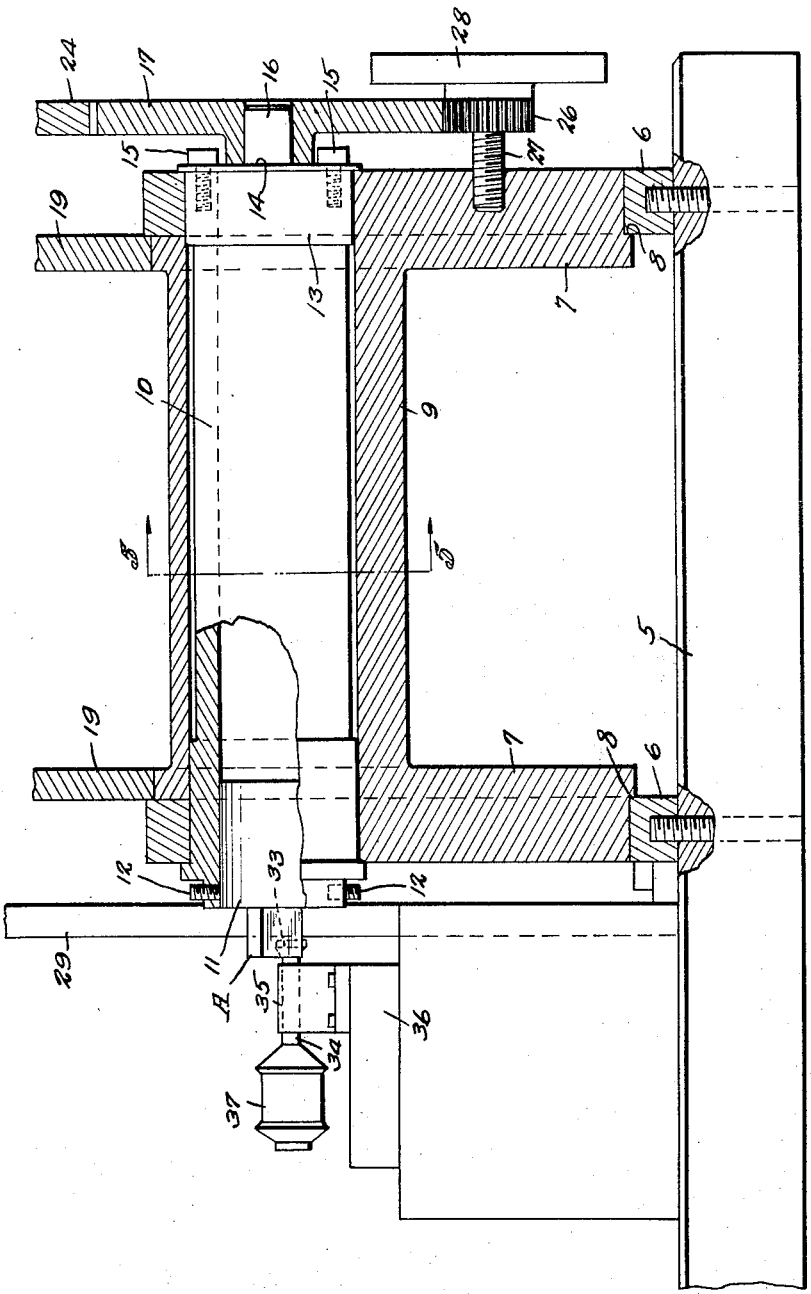

2,559,176

UNITED STATES PATENT OFFICE 2,559,176

MECHANICAL MOVEMENT FOR PROFILE AND CONTOUR CUTTING MACHINES

Edward Bruce Swayne, Norfolk, Va., assignor of one-half to Whaley Engineering Corporation, Norfolk, Va.

Application December 27, 1949, Serial No. 135,258

5 Claims. (Cl. 90—13.9)

1

This invention relates to profile and contour cutting and grinding machines.

The primary object of the invention is to provide a machine of this character wherein the article being cut or ground, is rotated with respect to the tool to change the position of the work to cut or grind the work, duplicating the contour or shape of the pattern being used in the machine, thereby eliminating chatter of the cutter which is the result of the cutting or grinding tool moving around the work, during the operation of the cutting tool.

An important object of the invention is to provide a machine of this character wherein the circular bearings, forming an important feature of the invention, and which support the work and templet, are of diameters greater than twice the radius from the instant center to the work center, to the end that the load from the cutter through the work will create a friction angle at the bearing friction circle which is sufficiently great so that the product of the cutter pressure and the coefficient of friction will be less than the force required to overcome bearing friction and cause rotation of the templet and work.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is an end elevational view of a mechanical movement constructed in accordance with the invention.

Fig. 2 is a front elevational view thereof.

Fig. 3 is a plan view of the machine.

Fig. 4 is an end view of the machine opposite to the end view shown by Fig. 1.

Fig. 5 is a sectional view taken on line 5—5 of Fig. 6.

Fig. 6 is a longitudinal sectional view through the circular bearings in which the chuck shaft operates.

Referring to the drawings in detail, the reference character 5 indicates the base on which the machine is mounted and to which the circular bearing rings 6 are secured, the bearing rings 6 being supported in upright positions adjacent to the ends of the base.

The reference character 7 indicates disc-like bearings that operate in the bearing rings 6,

2 the bearings 7 having portions of their peripheries or bearing surfaces cut away, providing annular shoulders 8 that bear against the inner surfaces of the bearing rings 6, holding the bearings 7 against lateral movement on the base 5.

The bearings 7 are connected by the hollow shaft 9 in which the barrel 10 is mounted, the hollow shaft 9 being eccentrically formed with respect to the disc-like bearings 7, as shown by Fig. 6 of the drawings.

Secured within one end of the barrel 10, is the chuck 11, which is of the conventional structure and provided with means for gripping the work under treatment, which in the present showing is indicated by the reference character A.

In the showing, the set screws 12 are provided, which set screws pass through openings in the end of the barrel, and grip the chuck 11.

At the opposite end of the barrel, is the bearing 13 over which the retaining disc 14 is secured by means of the bolts 15, whereby the barrel is held against longitudinal movement through the hollow shaft 9. Extending from the disc 14, is the shaft 16 on which the pinion 17 is secured by means of the set screw 18. Thus it will be seen that when the pinion 17 rotates, the barrel 10 with the chuck 11 at its opposite end, will be rotated, rotating the work supported in the chuck.

Extending from the bearings 7, at points adjacent to the ends of the hollow shaft 9, are parellel arms 19 that have bearing openings formed therein adjacent to the free ends thereof, the bearing openings supporting the shaft 20 to which the templet 21 is secured, to rotate therewith. In the present showing, the templet 21 is in the form of a rectangular elongated bar, which is secured to the shaft 20 to rotate therewith, by means of the set screw 22 which is disposed within a threaded opening of the templet 21 with its inner end bearing against the shaft 20.

On one end of the shaft 20, is the pinion 23 that meshes with an intermediate smaller pinion 24, the pinion 24 being in mesh with the pinion 17 that is mounted on the shaft 16 to rotate therewith.

The pinion 24 operates on the stub shaft 25 that extends from one of the arms 19, the pinion 24 acting as an idle pinion, through which movement from the pinion 17 is transmitted to the pinion 23. Rotation of the pinion 17 is provided by the small gear 26 that rotates on the shaft 27 extending from the disc-like bearing 7 at one end of the base 5.

Also mounted on the shaft 27, is the pulley 28, which is rotated by a suitable power mechanism not shown.

Secured to the base 5, and rising therefrom, are the vertical arms 29 which are formed with openings, in which the horizontal shaft 30 operates, the shaft 30 providing a support for the follower disc 31 against which the templet 21 engages, the templet rolling over the disc 31, as the bearings 7 and arms 19, oscillate.

Secured to the base and bearing against the hollow shaft 9 is the wide spring member 32, which spring member normally urges the hollow shaft 9, bearings 7 and arms 19, in one direction, to cause frictional contact between the pattern and member 21 to cause the arms 19 to move towards the follower disc or shaft supporting the follower disc, as the machine is in operation, so that the templet will follow the disc causing the arms 19 to move outwardly against the action of the side spring 32.

The tool is indicated by the reference character 33 and is mounted on the shaft 34 that operates in the bearing 35 that in turn is positioned on the support 36 which may be of any desirable construction.

The reference character 37 indicates a pulley mounted on one end of the shaft 34 and which is rotated by a suitable power belt not shown.

From the foregoing it will be seen that instead of pivoting the system around a center bearing as is customary in metal working machines, the bearing in the present showing and which supports the work and the templet, is of a diameter which is greater than twice the radius from the instant center to the work center to the end that this enlarged bearing causes the load from the cutter through the work to create a friction angle at the bearing friction circle within the bearing rings 6 which is sufficiently great so that the product of the cutter pressure or tool pressure and the coefficient of friction will be less than the force required to overcome bearing friction and cause rotation of the disc-like bearings 7, to cause the oscillation of the arms 19, to accomplish the purpose of the invention.

Having thus described the invention, what is claimed is:

1. In a pattern metal working machine, a base, bearing rings rising from the base, bearings operating within the bearing rings, a hollow shaft connecting the bearings, parallel arms rising from the bearings, a templet shaft mounted on the arms to which a templet is secured, a barrel extending through the bearings, a chuck secured to one end of the barrel to rotate therewith, gearing operating the barrel and templet shaft, one of the gears being secured to the barrel rotating the barrel, one of said gears being secured to the templet shaft rotating the templet shaft and templet mounted thereon, a rotating follower disc, against which the templet rotates oscillating said parallel arms, a spring member mounted on the base and engaging said hollow shaft urging the arms toward the follower disc and holding said templet into contact with the follower disc, a tool disposed in cutting relation with work supported within the chuck forming the work according to the shape of the templet as the chuck and work moves with respect to the tool, and a power gear rotating the gearing.

2. In a profile or pattern cutting machine, a base, bearing rings rising from the base, disc-like bearings mounted within the bearing rings, a hollow shaft connecting the disc-like bearings, a barrel rotatably mounted within the hollow shaft, said barrel supporting a chuck on one end thereof for rotation therewith and to which the work under treatment, is secured, parallel arms extending upwardly from the disc-like bearings, a rotary templet shaft connecting said arms on which a templet is secured, a horizontal shaft mounted adjacent to the templet shaft, a follower disc over which the templet operates in contact therewith, means for rotating the templet shaft and templet mounted thereon, whereby said arms, bearings and barrel are oscillated during rotation of the barrel, and a rotary cutting tool contacting the work supported on the rotating chuck.

3. In a profile or pattern cutting machine, a base, spaced bearing rings disposed vertically on the base, disc-like bearings mounted within the bearing rings, a hollow shaft integrally connecting the disc-like bearings eccentrically of the axis thereof, a barrel extending through the hollow shaft, arms rising from the disc-like bearings, a templet shaft connecting the arms at the upper ends thereof, a templet mounted on the templet shaft, a rotary follower disc against which the templet moves, means for simultaneously rotating the barrel and templet shaft whereby the arms and bearings are oscillated, and a metal working tool supported adjacent to the work held in the chuck, cutting the work with a contour corresponding with the pattern of the templet.

4. In a profile or pattern cutting machine, a base, vertical bearing rings rising from the base, bearings mounted in the bearing rings and extending upwardly from the bearings, a templet shaft mounted at the upper ends of the shafts on which a templet is secured, a follower disc against which said templet rotates oscillating the arms and bearings, a barrel extending through the bearings, a work chuck secured in one end of the barrel in which the work under treatment is held, and oscillates with the bearings, a tool support mounted on the base and a metal working tool mounted on the tool support engaging the work as the work rotates against the tool.

5. In a profile or pattern cutting machine, a base, vertical oscillating bearings mounted on the base, a rotary barrel mounted on the bearings, vertical arms rising from the bearings, a templet supported by said arms, an idle follower disc supported adjacent to the templet against which the templet rotatably engages oscillating the bearings, a chuck mounted on one end of the barrel to which the work is secured, means for rotating the barrel and work, and a cutting tool mounted adjacent to the work against which the work moves cutting the work to conform to the shape of the templet.

EDWARD BRUCE SWAYNE.

REFERENCES CITED

The following references are of record in the file of this patent:

UNITED STATES PATENTS

| Number | Name | Date |
|---|---|---|
| 38,823 | Hayden | June 9, 1863 |
| 312,198 | Frossard | Feb. 10, 1885 |
| 677,593 | Pearse | July 2, 1901 |
| 1,527,208 | Melling | Feb. 24, 1925 |
| 1,847,171 | Christman | Mar. 1, 1932 |
| 2,529,026 | Kestell | Nov. 7, 1950 |